Patented May 7, 1935

2,000,338

UNITED STATES PATENT OFFICE 2,000,338

METHOD OF INDURATING CLAY AND PRODUCT FORMED THEREFROM

Max H. Kliefoth, Madison, Wis., assignor to C. F. Burgess Laboratories, Inc., Madison, Wis., a corporation of Delaware No Drawing. Application July 28, 1932, Serial No. 625,525

24 Claims. (Cl. 25—156)

This invention relates to a method for indurating clays and clay-like materials at low temperatures.

An object of this invention is to provide a method of treating clays and clay-like materials to produce molded or shaped articles which, after firing at low temperatures, will have the hardness of a clay fired at a temperature near its fusion point. The product also approaches the resistance to disintegration by water of the ordinary product fired at high temperatures. Further objects are to provide a method whereby organic materials and other materials affected by heat may be incorporated in hardened ceramic products made of clay—and to provide a method for making molded indurated clay products without the use of high temperatures with the consequent large saving in equipment and fuels. Other objects will become apparent in the balance of the specification.

I have found that it is possible to indurate clay and clay-like materials by mixing a small amount of caustic alkali with the moist or wet clay or clay-like material, shaping the desired product from this mixture and heating it at a low temperature. Some types of clays need to be heated only slightly above the boiling point of water. The resultant product is not disintegrated by water since the caustic alkali apparently reacts with the clay to form a water resistant product. Furthermore this product also acts as a binder to knit the mass of clay into a dense hard mass. Since the caustic alkali is fixed by this process so that water does not leach it out of the resultant product, it is probable that it reacts chemically with the clay or clay-like material to form one or more water-insoluble complex silicates. Whatever the explanation of the reaction may be, it is effective for producing indurated and water-resistant clay products at low temperatures. Both caustic soda and caustic potash may be used, the former being preferred because of its lower cost.

Although my invention may be applied to clays and clay-like materials in general, nevertheless the treatment must be varied somewhat to obtain comparable results with different types of clays and clay-like materials. Such materials vary over a wide range of compositions and therefore differ in their properties. A clay consists of one or more hydrous aluminum silicates mechanically admixed with varying amounts of impurities. The considerable number of known aluminum silicates cover a wide range of compositions. In addition, aluminum silicates of the same composition may differ in their physical properties. These differences are accentuated further by the varying amounts of impurities mechanically admixed with the hydrous aluminum silicate. A clay may be an aluminum silicate of high purity, such as a high grade kaolin, or it may be a very impure clay not suitable even for making a poor quality of brick or drain tile. Not only is my process applicable to a variety of clays but it also may be applied to other similar aluminous products such as the bauxites, especially the lower grade bauxites which contain a large amount of silica, either free or combined with the alumina. I have designated as "clay-like" materials closely related aluminous products, such as bauxites and other aluminum silicates, which may be impure or which may not have the plastic properties of the clays but which may be indurated with caustic alkalis to resist disintegration by water as herein described.

The fire clays which I have tested seem to be especially amenable to the process which is the subject of this application. It is possible to harden these fire clays at low temperatures, substantially below 500° C., with as low as 2% of caustic soda (based on the weight of the clay). When so hardened, they do not soften or disintegrate when subjected to the action of cold or boiling water for a long period of time. The crushing strength also is increased several fold over a clay tempered only with water and fired at the same low temperature. The amount of caustic soda, in most cases, may be further decreased to 1½% by giving the fire clay a preliminary roast at about 300° C. to 500° C., the preferred temperature range varying somewhat with each clay. Since this preliminary roasting makes the clay more reactive to many chemicals it is probable that this increased reactivity accounts for the decreased caustic alkali necessary to indurate the clay and also to make it water-resistant. If the clay only needs to be hardened but not made water-resistant the amount of caustic alkali may be decreased still further. The effect of the caustic alkali decreases in proportion to the decreasing amount used and my invention does not contemplate including within its limits the very small amounts used in deflocculating clay or otherwise treating clay during its preparation for the ceramic industries (usually under about 0.25 per cent) and where the clay so treated is subsequently molded or shaped and then fired at high temperatures. It usually is desirable to use at least 1% of caustic alkali.

The caustic alkali is preferably dissolved in water before it is added to the clay so that it may be disseminated more thoroughly throughout it. The strength of the solution used is dependent upon the amount of caustic alkali needed to produce the required result and also upon the moisture content of the clay. It will be apparent to those skilled in the art that if it is dry a weaker solution may be used because more water is needed to make the clay plastic so that it may be shaped. After the caustic alkali is added to the clay in the correct proportion, the moist mixture is worked, as in a pug-mill, until the caustic alkali is disseminated uniformly throughout the plastic mass. The plastic mass is then shaped into the desired forms, as by molding, extruding, etc. in the usual manner, due consideration being given to the presence of the caustic alkali in the handling thereof. The moist shaped product is air dried, or otherwise dried at a low temperature in the usual manner, to evaporate excess water. After so drying, it is fired at a temperature sufficient to fix the caustic alkali and evaporate further amounts of water. If the moist or dry articles are exposed to the air, or other gases containing carbon dioxide, for too long a period of time before the final firing, excessive carbonation of the caustic alkali will occur. If too much of the caustic alkali is carbonated, the hardening and waterproofing action is decreased.

The firing temperature may vary over a wide range depending upon the exact properties desired, the type of clay or clay-like material used and the amount of caustic alkali used. Although the mixtures of clay, or clay-like material, and caustic alkali of this invention are such that the clay or clay-like product formed is indurated by the caustic alkali if fired at temperatures substantially below 500° C., usually not more than 400° C., and preferably at temperatures between 250° C. and 400° C., though temperatures as low as 100° C. may be used, nevertheless the mixtures may be fired at higher temperatures up to about those usually used (red heat or above) with equally good results.

The fire clays which require no more than 2% of caustic soda for excellent results may, in some cases, be fired at temperatures at or slightly above 100° C., usually 110° C. The resulting product is hard, stone-like and water-resisting to a degree, that is, it does not disintegrate when subjected to the action of both hot (boiling) and cold water for limited lengths of time. However, it is possible to leach a small amount of free alkali from it by means of hot or cold water and the hardened clay product will finally disintegrate. This indicates that all of the alkali has not been fixed permanently. It is suitable, however, for many purposes. By increasing the firing temperature, for a specific example, to 200° to 250° C., it becomes still harder, resembling vitrified clay, and the caustic alkali is fixed sufficiently so that an appreciable amount is not removed by leaching. The clay then seems to resist the action of water almost indefinitely. By increasing the caustic soda content to 5% both the hardening effect and water-resistance are increased. Furthermore, the product does not contain any appreciable amount of free alkali (hot water leaching test) if fired at 200° to 250° or above. As the caustic alkali content is increased beyond 5% a point is reached where all of it is no longer fixed by the low-temperature firing and the excess may be leached out with water. For a certain fire clay this point is at about 8% of caustic soda. A fire clay indurated with this amount of caustic soda is of flint-like hardness and it is difficult and sometimes it is impossible to cut it with a carborundum saw. With small additional amounts of caustic soda, although the clay become flint hard, the free alkali present causes efflorescence on the surface.

Each clay or clay-like material seems to require a different proportion of caustic alkali and a different temperature to obtain the desired or optimum results at the lowest cost. Ordinary brick clays vary over a wide range of composition not only as to the type of aluminous silicate forming the basic material but also as to the amount and type of impurities present. Such clays may require the addition of as much as 7% or 8% of caustic soda and a firing temperature of at least 300° to 400° C. It is possible that certain clays may not be benefited by the caustic alkali treatment but such clays have not come to my attention. As a further example a certain western brick shale clay requires the addition of at least 5% of caustic soda and a firing temperature of 110° C. in order to give it desired hardness and limited resistance to disintegration by water. When heated to 300° C. it is highly resistant to disintegration by water. A high grade of kaolin tested requires only slightly more caustic alkali than the fire clay. A low grade of bauxite containing from 12% to 16% of silica, 45% of alumina and 3% of iron oxide, is hardened and made partially water-resistant by the addition of 2.3% of caustic soda with a firing temperature of 110° C. It is made highly water-resistant if fired at 250° C. Bentonite, which may be indurated by my method, is a mixture of two hydrous aluminum silicates of varying proportions accompanied by varying amounts of impurities. It is especially amenable to the caustic alkali treatment, the amount and temperature required being approximately the same as for fire clay. It is similar to a good grade of fire clay in that a good grade may be indurated with a small amount of caustic alkali at a relatively low temperature to provide a product that is almost porcelain hard and water-resistant.

It is also possible to incorporate other materials, such as granular aggregates, with the clay or clay-like material. Because of the low firing temperature it is not necessary to confine these materials to inorganic products that withstand high temperatures. A wide variety of granular aggregates may be used and it is not necessary to confine the aggregate to one having a high temperature melting point, such as silica. It is possible to use aggregates or other body materials which soften or decompose at fairly high temperatures, but which may be affected by the high temperature necessary to fire clay tempered with water, such as Haydite, cinders, pumice, blast furnace slag, exfoliated vermiculite, mica, limestone, asbestos, etc. In addition, low melting point aggregates which decompose or become reactive when subjected to high temperatures may be used. Limestone (including dolomite) and certain types of low melting point slags are examples of such materials. A limestone aggregate may be used without danger of decomposition and the resulting liberation of carbon dioxide which may rupture the article being fired.

Granular limestone (including dolomite) may therefore be incorporated in bricks, building blocks, and like products made of clay indurated by my process. This widely distributed and cheap material may thus be used to further cheapen the cost of these widely used building materials. Clay or clay-like materials treated according to my process may therefore be used as a partial substitute for the more expensive Portland cement in making building blocks. Where the firing temperature is kept below 200° C. cellulose in its various forms may be incorporated in the clay or clay-like material without being charred during the indurating process. Fibrous cellulosic materials and other organic fibrous materials, such as hair, may therefore be used for reenforcing the clay if necessary. Some types of organic as well as inorganic coloring materials may be incorporated with the clay. Composite objects of indurated clay or clay-like material and wood or other organic materials, such as vulcanized rubber, condensation products, and the like may be made. Low melting point metals and easily oxidized metals such as lead, zinc, tin, copper and aluminum and iron may be incorporated (for reenforcing and other purposes) in the clay or clay-like products before firing and firmly anchored therein during the hardening operation without melting, oxidizing or warping which would occur during the firing of ordinary ceramic products. Kieselguhr or diatomaceous earth may be incorporated with the clay to make a lightweight product. Other porous materials, either organic or inorganic also may be used to produce a light-weight hardened clay product. The field of clay products is greatly extended thereby especially since the shrinkage resulting from my induration process is less than the shrinkage produced by high temperature firing.

My process also is adapted especially to the production of stone-like objects made of clay which are of delicate construction and therefore are subject to excessive warping when fired at high temperatures unless special mixes are used and great care is exercised during the firing operation. Furthermore, clay products indurated by my process do not require any careful annealing treatment such as is necessary with the products fired at high temperatures.

The large saving in the initial cost and upkeep of high temperature equipment will be apparent to those skilled in the art. In regions where fuel is high in cost the savings effected by the low temperature of firing more than offset the cost of the caustic alkali used if an excessive amount of caustic alkali is not required. In such regions ordinary building brick, tile and the like may be made of clay or clay-like materials indurated by my process at a saving over the high temperature process, without considering the further savings which also may be effected by incorporating a cheap limestone or other aggregate in the indurated product. Even where fuel is low in cost, special shapes difficult to fire, and also shapes containing insets of metals and other materials may be advantageously made by my process. Furthermore, the products may be finished in a relatively short time because of the short firing time. There is also less breakage resulting from the burning operation.

As a specific example I have found that my process is used to great advantage in the production of thin-walled small tubes especially in the form of short tubes or beads that are used for absorbing gaseous pressure-waves, such as in mufflers and in acoustical installations in accordance with the disclosure of my copending application Serial No. 625,558 filed July 28, 1932. The short tubes or beads of said copending application are preferably about ⅛ inch in diameter, are from ⅛ to ⅜ inch long and have a wall thickness of about .015 inch. The dimensions may vary over a considerable range. When used in mufflers these tubes or beads are subject to excessive abrasion, heat and moisture, and therefore must withstand these difficult conditions of use. Furthermore they must be light in weight. The short tubes or beads are made from a fire clay tempered with caustic alkali. This mixture preferably also contains kieselguhr to meet the weight requirements. A suitable mixture illustrative of the invention follows: 48% fire clay, 48% kieselguhr and 4% caustic soda. The moist plastic mix is extruded through suitable dies to form tubes which are cut to length. These thin-walled tubes are then given a preliminary drying after which they are fired at a temperature of at least 200° C. to 300° C. The resulting tubes or beads, in addition to being water-resistant and of a stone-like texture, have a smooth outer surface which resists abrasion. The low firing temperature makes it possible to make these tubes having paper-thin walls quickly at a low cost and with great uniformity that is otherwise difficult to achieve.

Although it usually is preferable to mix the caustic alkali with the clay or clay-like material prior to the shaping of the final product made therefrom, it is possible to incorporate the caustic alkali after the product has been shaped. The shaped clay product, made in the usual way by tempering the clay with water and shaping, is given a preliminary drying and it is then sprayed or otherwise subjected to the action of a caustic alkali solution, due care being exercised to prevent disintegration of the shaped clay material. The depth of penetration of the caustic alkali solution is dependent upon the physical condition of the clay, its dryness, and time of treatment. The resulting clay product is now fired preferably at a low temperature as hereinbefore described. The fired product may only have a surface skin of indurated clay or the hardening action may extend throughout it, depending upon the depth of penetration of the caustic alkali solution. My process therefore also provides a method for case-hardening shaped products of clay or clay-like materials.

I claim:

1. The method for indurating clay or clay-like materials which comprises disseminating a small amount of caustic alkali throughout said clay or clay-like material, and heating said mixture at a temperature substantially above 110° C. but not above 500° C. to produce a non-vitrified product having hardness approximating that of clay fired at a temperature near its fusion point.

2. The method of making an indurated shaped product of clay or clay-like material, which comprises mixing a clay or clay-like raw material with a small amount of caustic alkali solution, shaping said product from the resulting mixture, and heating said shaped mixture at a temperature between 200° C. and 400° C. to produce a non-vitrified product having hardness approximating that of clay fired at a temperature near its fusion point.

3. The method of making a structure of an indurated clay or clay-like material which comprises mixing a clay or clay-like raw material with from 1% to 8% of caustic soda, shaping said structure from the resulting mixture, and heating said shaped mixture at a temperature between 250° C. and 400° C. to produce a non-vitrified product having hardness and water resistance approximating that of clay fired at a temperature near its fusion point.

4. The method of making indurated clay or clay-like material which comprises disseminating from 2% to 5% of caustic soda through clay or clay-like material, and heating the resulting mixture at a temperature substantially above 110° C. and substantially below 500° C. to produce a non-vitrified product having hardness approximating that of clay fired at a temperature near its fusion point.

5. The method of making an indurated product of clay or clay-like material, which comprises mixing a clay or clay-like raw material with from 2% to 8% of caustic soda in water solution to form a plastic mass, shaping said product from said plastic mass, and heating said shaped mass at a temperature between substantially in excess of 110° C. and below 300° C. to produce a non-vitrified product having hardness approximating that of clay fired at a temperature near its fusion point.

6. The method of making an indurated shaped product of a fire clay, which comprises mixing a fire clay with from 1% to 8% of caustic soda in water solution to form a plastic mass, shaping said product from said plastic mass, and heating said shaped mass at a temperature substantially above 110° C. and below 400° C. to produce a non-vitrified product having hardness approximating that of clay fired at a temperature near its fusion point.

7. The method for indurating clay or clay-like materials which comprises heating said clay or clay-like material to make it more reactive, disseminating a small amount of caustic alkali throughout said activated material, and heating said mixture at a temperature substantially above 110° C. and below 400° C.

8. The method of making a case-hardened shaped product of a clay or clay-like material, which comprises adding water thereto to form a plastic mass, shaping said plastic mass, disseminating caustic alkali in solution in the outside portion thereof, and heating said impregnated shaped product at a temperature substantially above 110° C. and below 400° C.

9. The method of making an indurated shaped product of a clay or clay-like material which comprises adding water thereto to form a plastic mass, shaping said plastic mass, impregnating said shaped product with caustic alkali in solution, and heating said impregnated product at a temperature above 200° C. and below 400° C.

10. As an article of manufacture, a shaped body of the reaction product resulting from the heating at a low temperature of a clay or clay-like material containing a small amount of caustic alkali intimately associated therewith, said body being a non-vitrified product having hardness approximating that of clay fired at a temperature near its fusion point.

11. The article of claim 10 containing from 1 percent to 8 percent of fixed caustic soda disseminative therewith.

12. The article of claim 10 comprising a water resistant indurated clay or clay-like material containing from 2 percent to 8 percent of fixed caustic soda disseminated therethrough, said caustic soda having been fixed by heating said clay or clay like material at a temperature substantially below 500° C.

13. The article of claim 10 in which the clay or clay-like material is a hydrous aluminum silicate.

14. The article of claim 10 in which the clay or clay-like material comprises bentonite.

15. The article of claim 10 in which the clay or clay-like material comprises a bauxitic material.

16. The article of claim 10 in which the clay or clay-like material comprises a fired clay.

17. The article of claim 10 in which the clay or clay-like material is mixed with an aggregate.

18. The article of claim 10 in which the clay or clay-like material is mixed with a limestone aggregate.

19. The article of claim 10 in which the clay or clay-like material is mixed with a porous aggregate.

20. The article of claim 10 in which the clay or clay-like material is mixed with a fibrous material.

21. The article of claim 10 in which the clay or clay-like material is mixed with an organic material, said caustic alkali having been fixed by heating said clay or clay-like material and said caustic alkali at a temperature below the charring temperature of said organic material.

22. The article of claim 10 in which the clay or clay-like material is mixed with a cellulosic material, said caustic alkali having been fixed by heating said clay or clay-like material and said caustic alkali at a temperture below the charring temperature of said cellulosic material.

23. The article of claim 10 in which the product is in the form of short-length tubes or beads.

24. An article of manufacture comprising a shaped body of clay or clay-like material having an indurated surface layer formed of the reaction product resulting from the heating at a low temperature of said clay or clay-like material with a small amount of caustic alkali, said surface layer being a non-vitrified product having hardness approximating that of clay fired at a temperature near its fusion point.

MAX H. KLIEFOTH.